Dec. 6, 1960  E. KOKALAS  2,963,536
CLAMPING AND SEALING DEVICE
Filed Sept. 27, 1956

INVENTOR.
EDWARD KOKALAS
BY Bauer and Seymour
ATTORNEYS

United States Patent Office 2,963,536
Patented Dec. 6, 1960

2,963,536

CLAMPING AND SEALING DEVICE

Edward Kokalas, Sidney, N.Y., assignor to The Bendix Corporation, a corporation of Delaware Filed Sept. 27, 1956, Ser. No. 612,512

8 Claims. (Cl. 174—77)

This invention relates to clamping and sealing devices, and more particularly to means for clamping one or more cables, rods or the like, such as at or adjacent a mechanical or electrical connection, in a substantially moisture-proof and mechanically secure manner.

One of the objects of the present invention is to provide a novel device for mechanically clamping an elongated member and simultaneously forming a substantially water-tight seal around the same and an opening through which it extends.

Another object is to provide novel clamping means which is so constructed that the same may be readily applied to one or more insulated wires of a cable, for example, without danger of damaging or impairing the strength or efficiency of the wires.

A further object is to provide novel clamping and sealing means which does not apply any torque to the elongated members such as wires passing therethrough as the sealing means is tightened upon them.

Still another object is to provide a novel, substantially water-tight fitting around one or more elongated members such as wires, such fitting being light and compact, and thus useful as a part of one of the elements of an electrical connector.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refers to like parts throughout the several views, Fig. 1 is a view in side elevation of the sealing and clamping means of the invention attached to one element of an electrical connector.

The invention is illustrated in the accompanying drawing, by way of example, in the form of means for clamping a plurality of wires against longitudinal or torsional movement relative to a part electrically connected therewith, and substantially to seal the interior of such part against the entrance of moisture, such as water. It will be understood, of course, that the wires of the cable may be replaced by other elongated bodies, such as rods, tubes, or the like, and that the part to which the clamping and sealing means is connected may be a member, such as a conduit or the like, into which the one or more elongated bodies pass upon leaving the clamping and sealing means. One very useful application of the invention is in combination with multiple contact plug and socket connectors, such as those disclosed in U.S. Patents Nos. 2,563,762 and 2,662,219.

Figures 1, 2:
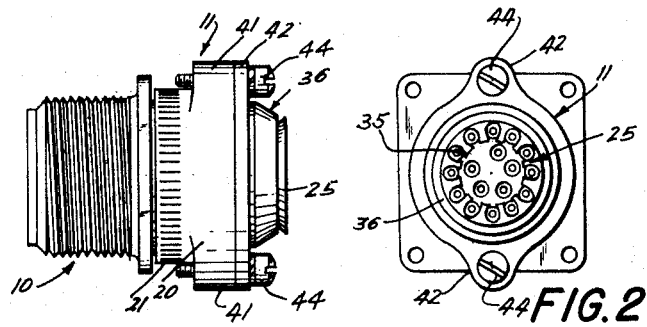
Fig. 2 is a view in end elevation of the device of Fig. 1, the view being taken in the direction from right to left in Fig. 1.
Figure 3:
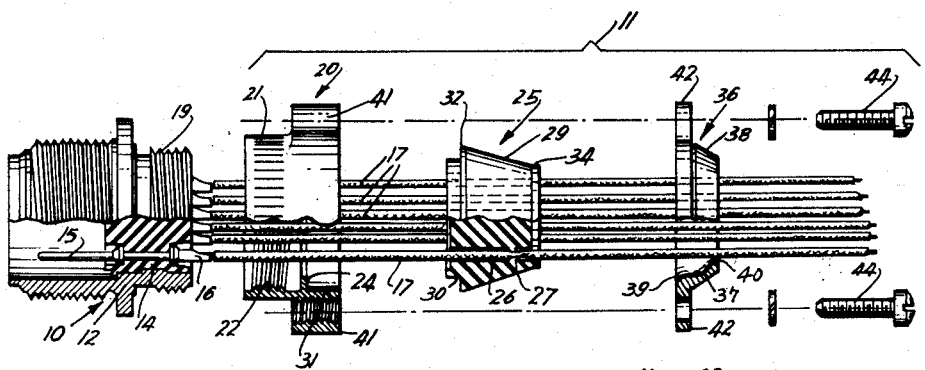
Fig. 3 is an exploded view in side elevation of the device of Figs. 1 and 2 showing wires connected thereto, certain of the parts being shown partially in section.

In the specific embodiment illustrated, the fitting 10 with which the novel clamping means 11 is combined is a female element of a multiple conductor cable connector generally similar to that shown in Fig. 2 of Patent No. 2,563,762. Such element 10 has a hollow generally cylindrical body 12, within which is non-rotatably secured an insulating insert 14, made for example of rubber, in which are mounted a plurality of longitudinally extending contact pins 15. Pins 15 are adapted to be received in contact sockets mounted in a male connector element (not shown) receivable in the left hand end (Figs. 1, 3, and 4) of element 10.

The various contact pins 15 have solder wells 16 on the ends thereof outwardly of insert 14, whereby the pins are connected to conductor wires 17 of a multiple cable. The clamping and sealing device 11, in the embodiment shown, is connected to the outer end of element 10, and secures the wires 17 against axial movement with respect to body 12 of element 10, thereby protecting the wire connections at solder wells 16 from undue strain when a pull is imposed upon element 11 through one or more wires. Device 11 also protects the connections at solder wells 16, and the insulation inwardly of the connector element 10 and of device 11 from the penetration of moisture tending to cause short circuiting between the various wires and connector parts. Thus the sealing and clamping device of the invention is useful, for example, for installation in an airplane, wherein parts are subjected to marked variations in atmospheric pressure and thus, unless sealed, are prone to the penetration of moisture.

Figures 4, 5:
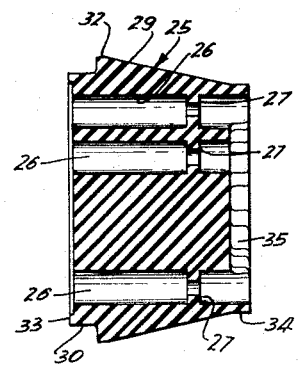
Fig. 4 is a view in longitudinal axial section through the device of Figs. 1 and 2, the device having a plurality of insulated wires connected thereto.
Fig. 5 is a view in longitudinal axial section through the resilient grommet which is a part of the illustrative clamping and sealing means.

The illustrative device 11 has a hollow main or intermediate body 20 of generally cylindrical shape, body 20 being attachable to element 10 by screwing the threaded portion 19 of the latter into internal threads 22 on forward end portion 21 of body 20, as shown in Fig. 4. Rearwardly of threaded portion 21 body 20 is provided with a shallow radially inwardly projecting flange 24, and, rearwardly of flange 24, with a small cylindrical sidewall 31.

The seat provided within body 20 by the flange 24 and sidewall 31 receives the forward, larger base portion of a resilient grommet 25 which clamps the wires 17 and forms a seal therewith. Grommet 25 may be made, for example, of natural or synthetic rubber. Grommet 25 has a plurality of longitudinally extending wire-receiving passages 26 therethrough which are located to receive the rear ends of the respective solder wells 16 to which the wires are attached. A shallow distortable internal flange or pierced diaphragm 27 is provided in each passage 26, so that the grommet can accommodate and effect a seal with wires of various different diameters. Preferably the grommet 25 is provided with passages 26 corresponding in number and spacing to the maximum number of contact pins 15 employed in a given size of connector element. If certain contact pins 15 and/or their wires 17 are omitted in any particular installation, the corresponding passage or passages 26 are plugged with an insulating elongated body, such as a plastic rod, of appropriate diameter.

Grommet 25 has a frusto-conical peripheral surface 29 which has its larger or base end adapted to be disposed within the seat provided by flange 24 and inner sidewall 31 of body 20 of the device 11. An annular peripheral recess 30 having a cylindrical sidewall is provided in the grommet at its base end, there being a narrow cylindrical peripheral surface 32 between recess 30 and the larger end of frusto-conical surface 29. The transverse surface of grommet 25 at its larger end inwardly of recess 30 is generally flat, there being a narrow axially extending peripheral flange 33 at the edge of such surface. Beyond the rear, smaller diametered end of surface 29 there is a narrow cylindrical sidewall portion 34. The central portion of the smaller or rear end of the grommet is relieved or cut away, as shown at 35. In the embodiment shown, such relieved portion 35 has a diameter such that it shallowly intersects the outer circular row of wire-receiving passages 26.

The surface 32 of grommet 25 is of such relaxed diameter as to be snugly but slidingly received within sidewall 31 of body 20. Recess 30 has a sidewall diameter such that the forward portion of the grommet is snugly but slidingly received within flange 24. Recess 30 is of such axial length that, when grommet 25 is axially compressed by cap 36 in the manner shown in Fig. 4, the forward end of the grommet, beyond flange 24, is brought into forcible contact with the rear end surface of insert 14, whereby flange 33 on the grommet is flattened and the confronting end surfaces of the insert and the grommet are sealed together.

The cap 36 is made with a main body 38 in the form of a generally open-ended cup-shaped sleeve. Such body 38 has a narrow circular cylindrical inner sidewall 37, sidewall 37 being connected to the flat front surface of the cap by an annular surface 39 the elements of which are smoothly curved and convex toward the axis of the cap. The rear end of surface 37 smoothly merges with an annular surface 40 the elements of which are concave toward the axis of the cap. The diameter of surface 37 lies intermediate the relaxed diameters of the larger and smaller ends of frusto-conical surface 29 of grommet 25.

The cap 36 is retained on body 20 of the clamping and sealing device by screws 44 which extend through holes in opposite extending ears 42 on the cap and are threaded into holes in the similarly located ears 41 on body 20. Preferably the grommet 25 is lubricated on its outer surface, as by a coating of petrolatum. When the cap 36 has been tightened against the body, as shown in Fig. 4, grommet 25 is distorted so that its peripheral surface conforms to the inner surface of the cap. This causes the grommet to be forced strongly inwardly, particularlly in the zone of surface 40 of the cap 36, so that the walls of passages 26 strongly grip and effect a seal with wires 17. It is advantageous to locate the diaphragms 27 generally in the zone of surface 40 of the cap, since they tend to grip the wires somewhat more strongly than the remainder of the extents of the walls of passages 26. It will be seen that when the cap 36 is in fully applied position (Fig. 5) the rear end of grommet 25 in the illustrative embodiment thereof is forced out of the cap to an appreciable extent. The relieved central zone 35 at the rear end of the grommet allows the material thereof, in effect, to flow inwardly more readily about the wires 17 and thus to effect an impervious seal with the wires.

The manner of use of the clamping and sealing device of the invention, and the advantages thereof are believed to be obvious from the above. However, for the sake of completeness, they will be briefly reviewed. The free ends of wires 17 are introduced, in that order, through cap 36, the proper passage 26 in grommet 25, and body 20 of device 11, after which they are soldered to pins 15 at solder wells 16. The body 20 is then screwed onto element 10, grommet 25 is thrust to the left (Fig. 3) along wires 17 until it seats against flange 24, and cap 36 is applied to the grommet and pulled home against body 20 by screws 44.

The clamping and sealing device 11 is simple, rugged, light and compact. Its presence does not interfere in any way with the use of connector element 10, nor with the connection of wires 17 thereto. Grommet 25 is easily slid along the wires when it is in its relaxed state. The cap 36 subjects the grommet merely to generally axial and generally radial compression, and, at the rear end of the grommet to some axial extension, the screws 44 not only drawing the cap 36 toward body 20, but also holding such parts against relative rotation. As a result, the wires are not subjected to any torque during either the cap-tightening or cap-loosening operations. Consequently with the device of the invention there is no danger damaging the wires or their connection to the connector element, as there sometimes is with clamping and sealing devices in which the outer grommet-engaging and compressing member rotates relative to the grommet.

The clamping and sealing device of the invention is of advantage, when a removable intermediate body 20 is employed, since it facilitates the removal of grommet 25 as for inspection of the solder wells 16. When the removal of the grommet is desired, the screws 44 and cap 36 are removed, after which body 20 is unscrewed from member 10. This produces a "jacking" action upon the grommet since it is carried axially along with body 20 by reason of the engagement of flange 24 on body 20 with the grommet. The torque thus applied to the grommet and thus to the solder wells and wires is only temporary and is soon relieved, and no permanent misalignment of the pins 15 results from such withdrawal of the grommet.

Although only one embodiment of the invention has been illustrated in the accompanying drawing and described in the foregoing specification, it is to be expressly understood that the invention is not limited thereto. For example, the invention in its broader aspects may be adapted to use in other fields, such as in the fields of stuffing boxes and packing around rotating or reciprocating parts wherein other kinds of known materials for some of the elements may be found useful. Other changes, such as in the specific shapes and sizes of the parts illustrated, may be made without departing from the spirit, scope, and objects of the invention, as will now be apparent to those skilled in the art.

What is claimed is:

1. In electrical apparatus, supporting means from which at least one electrical conductor emerges, an intermediate body attached to and axially removable from the supporting means, a resilient frusto-conical grommet closely surrounding said conductor and disposed with its larger end confronting the intermediate body, means on the intermediate body providing an annular seat for the larger end of the grommet, the grommet when relaxed having a frusto-conical peripheral surface of appreciable length, and means for axially compressing said grommet into compressive end-to-end engagement of its larger transverse end surface with said seat in the intermediate body and for simultaneously deforming and radially compressing the grommet into compressive circumferential engagement with said conductor, said compressing means comprising a cup-like sleeve surrounding said grommet and having an inner cylindrical sidewall overlying the frusto-conical surface of the grommet, and means exerting substantially only a straight-line thrust on the cup-like sleeve for thrusting it toward the intermediate body, the grommet engaging the intermediate body so as to be axially removable from the supporting means with the intermediate body.

2. Apparatus as defined in claim 1, wherein the intermediate body has screw threaded engagement with the supporting means.

3. Apparatus as defined in claim 1, wherein diametrically spaced ears are provided, respectively connected to the intermediate body and on the cup-like sleeve, and comprising threaded means cooperating with the ears to draw the sleeve and the intermediate body toward each other.

4. In electrical apparatus, cylindrical supporting means from which at least one electrical conductor emerges, a resilient insert in the supporting means through which the conductor passes, a resilient frusto-conical grommet closely surrounding said conductor and disposed with its larger end confronting the supporting means, means on the supporting means providing an annular seat for the larger end of the grommet, the seat being formed by an inner sidewall and a radially inwardly projecting flange on the seat-providing means, the central portion of the larger end of the grommet projecting through the seat into abutment with the supporting means, means for axially compressing the grommet into compressive end-to-end engagement of its larger transverse end surface with said seat in the supporting means and for simultaneously deforming and radially compressing the grommet into compressive circumferential engagement with said conductor, an axially directed peripheral flange confronting the end of the resilient insert and deformable into sealing engagement therewith when the sleeve is drawn toward the supporting means, the compressing means comprising a cup-like sleeve surrounding said grommet and having an inner cylindrical sidewall overlying the frusto-conical surface of the grommet, and means exerting substantially only a straight-line thrust on the cup-like sleeve for thrusting it toward the supporting means.

5. Apparatus as defined in claim 4, wherein the cylindrical inner sidewall of the element overlying the frusto-conical surface of the grommet lies intermediate the length of the element and has a diameter equal to an intermediate diameter of the relaxed frusto-conical grommet surface.

6. Apparatus as defined in claim 5, wherein that portion of the surface of the inner sidewall of the element overlying the frusto-conical surface of the grommet which is adjacent the other of the elements is annular and is convex inwardly toward the axis of the grommet and which merges smoothly with the circular cylindrical portion of the sidewall.

7. Apparatus as defined in claim 6, wherein that portion of the surface of the inner sidewall of the element overlying the frusto-conical surface of the grommet which is remote from the other of the elements is annular and is concave inwardly toward the axis of the grommet and which merges smoothly with the circular cylindrical portion of the sidewall.

8. Apparatus as defined in claim 7, wherein the passage in the grommet has a diameter somewhat exceeding the diameter of the conductor to be received therein, and the grommet has a radially inwardly extending flange intermediate the ends of the passage and located generally in the transverse zone of the inwardly annular portion of the element overlying the grommet, said flange when relaxed being adapted snugly to receive the conductor therethrough.

References Cited in the file of this patent

UNITED STATES PATENTS

| | | |
|---|---|---|
| 2,047,126 | Hastings | July 7, 1936 |
| 2,170,393 | Tornblom | Aug. 22, 1939 |
| 2,275,762 | Horton | Mar. 10, 1942 |
| 2,463,542 | Jankura | Mar. 8, 1949 |
| 2,548,896 | Gutterman | Apr. 17, 1951 |
| 2,662,219 | Hennessey | Dec. 8, 1953 |
| 2,757,355 | Howes | July 31, 1956 |
| 2,874,206 | Bowers | Feb. 17, 1959 |

FOREIGN PATENTS

| | | |
|---|---|---|
| 24,441 | Great Britain | Dec. 21, 1914 |
| 596,264 | Germany | May 2, 1934 |